(12) United States Patent
Watanabe et al.

(10) Patent No.: US 10,937,248 B2
(45) Date of Patent: Mar. 2, 2021

(54) AUTOMOBILE PRODUCTION SYSTEM

(71) Applicant: TOYOTA JIDOSHA KABUSHIKI KAISHA, Toyota (JP)

(72) Inventors: Yoshihiko Watanabe, Toyota (JP); Yuji Nabeshima, Ama (JP); Koji Kawasaka, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/671,368

(22) Filed: Nov. 1, 2019

(65) Prior Publication Data

US 2020/0202630 A1 Jun. 25, 2020

(30) Foreign Application Priority Data

Dec. 20, 2018 (JP) .............................. JP2018-238039

(51) Int. Cl.
*G06T 19/00* (2011.01)
*G06Q 30/06* (2012.01)
*H04N 7/18* (2006.01)

(52) U.S. Cl.
CPC ....... *G06T 19/006* (2013.01); *G06Q 30/0621* (2013.01); *H04N 7/183* (2013.01); *G06T 2219/2008* (2013.01)

(58) Field of Classification Search
None
See application file for complete search history.

(56) References Cited

U.S. PATENT DOCUMENTS

| | | | |
|---|---|---|---|
| 10,083,478 B2* | 9/2018 | Shakes | G06Q 30/0641 |
| 2003/0120369 A1* | 6/2003 | Takaoka | G06Q 10/06 700/95 |
| 2018/0018764 A1* | 1/2018 | Glatfelter | G05B 19/41805 |
| 2018/0286131 A1* | 10/2018 | Friesen | G06T 19/006 |
| 2019/0026937 A1* | 1/2019 | Benoit | G06T 19/20 |
| 2019/0325660 A1* | 10/2019 | Schmirler | G05B 23/0216 |
| 2019/0347858 A1* | 11/2019 | Kuehne | H04N 13/344 |
| 2020/0034904 A1* | 1/2020 | Barone | G06Q 30/0643 |

FOREIGN PATENT DOCUMENTS

JP 2001-243292 9/2001

* cited by examiner

*Primary Examiner* — Ryan M Gray
(74) *Attorney, Agent, or Firm* — Oblon, McClelland, Maier & Neustadt, L.L.P.

(57) ABSTRACT

An automobile production system includes an image-pickup device configured to take images of vehicles to be manufactured on a manufacturing line, and a control device configured to control the image-pickup device. The control device associates the images of the vehicles to be manufactured acquired from the image-pickup device with information about purchasers of the vehicles to be manufactured.

2 Claims, 4 Drawing Sheets

AUTOMOBILE PRODUCTION SYSTEM

CROSS REFERENCE TO RELATED APPLICATIONS

This application is based upon and claims the benefit of priority from Japanese patent application No. 2018-238039, filed on Dec. 20, 2018, the disclosure of which is incorporated herein in its entirety by reference.

BACKGROUND

The present disclosure relates to an automobile production system.

Japanese Unexamined Patent Application Publication No. 2001-243292 discloses a technique in which a purchaser selects a method for manufacturing an ordered product and manufacturing data generated based on the selected manufacturing method is delivered to a manufacturer through a network.

SUMMARY

The present inventors have found the following problem with regard to the automobile production system.

According to the technique disclosed in Japanese Unexamined Patent Application Publication No. 2001-243292, design data of a product and its manufacturing method are delivered to a purchaser through a network. However, an actual state in which the product itself, which will be eventually delivered to the purchaser, is being manufactured is not delivered to the purchaser and hence he/she cannot observe the actual manufacturing state.

Since automobiles are expensive products for which safety is essential, there is a growing demand from purchasers that they should be able to check actual states in which automobiles themselves, which will be eventually delivered to the purchasers, are being manufactured.

The present disclosure has been made in view of such circumstances and provides an automobile production system capable of giving excellent customer satisfaction.

A first exemplary aspect is an automobile production system including:

an image-pickup device configured to take an image of a vehicle to be manufactured on a manufacturing line; and a control device configured to control the image-pickup device, in which the control device associates the image of the vehicle to be manufactured acquired from the image-pickup device with information about a purchaser of the vehicle to be manufactured.

In the automobile production system according to an embodiment of the present disclosure, the control device associates the image of the vehicle to be manufactured acquired from the image-pickup device with information about the purchaser of the vehicle to be manufactured. By the above-described configuration, the control device can deliver the image of the vehicle to be manufactured to the purchaser in real time and/or record the image on a storage medium. That is, a purchaser can check an actual state in which an automobile itself that he/she has purchased is being manufactured through real-time images or images recorded on a storage medium. As a result, it is possible to improve customer satisfaction.

The automobile production system may further include a display device configured to display the image, and the control device may deliver the image of the vehicle to be manufactured acquired from the image-pickup device to the display device in real time. It is possible to improve customer satisfaction as compared to the case where recorded images are checked.

The automobile production system may further include an input device by which a user can move an area to be shot by the image-pickup device through the control device while checking an image displayed in the display device. A shooting-prohibited area may be defined on the manufacturing line. Further, when the image-pickup device is operated by using the input device, the movement of the image-pickup device may be restricted so that the shooting-prohibited area is not shot. It is possible to actually check a part of a vehicle to be manufactured that a purchaser wants to check in detail while protecting technical know-how and trade secrets. As a result, it is possible to improve customer satisfaction even further.

When the control device displays the image of the vehicle to be manufactured in the display device, the control device may display at least one product or service that can be added to the vehicle to be manufactured together with the image of the vehicle to be manufactured, and generate a composite image of the vehicle to be manufactured in a state in which a selected product or service is added thereto from the image of the vehicle to be manufactured and display the generated composite image. The purchaser can easily determine whether or not to additionally order the product or the like and customer satisfaction at the time of actual purchase is improved.

According to the present disclosure, it is possible to provide an automobile production system capable of giving excellent customer satisfaction.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Specific embodiments to which the present disclosure is applied will be described hereinafter in detail with reference to the drawings. However, the present disclosure is not limited to the below-shown embodiments. Further, the following descriptions and drawings are simplified as appropriate for clarifying the explanation.

First Embodiment

<Automobile Production System>

Figure 1:
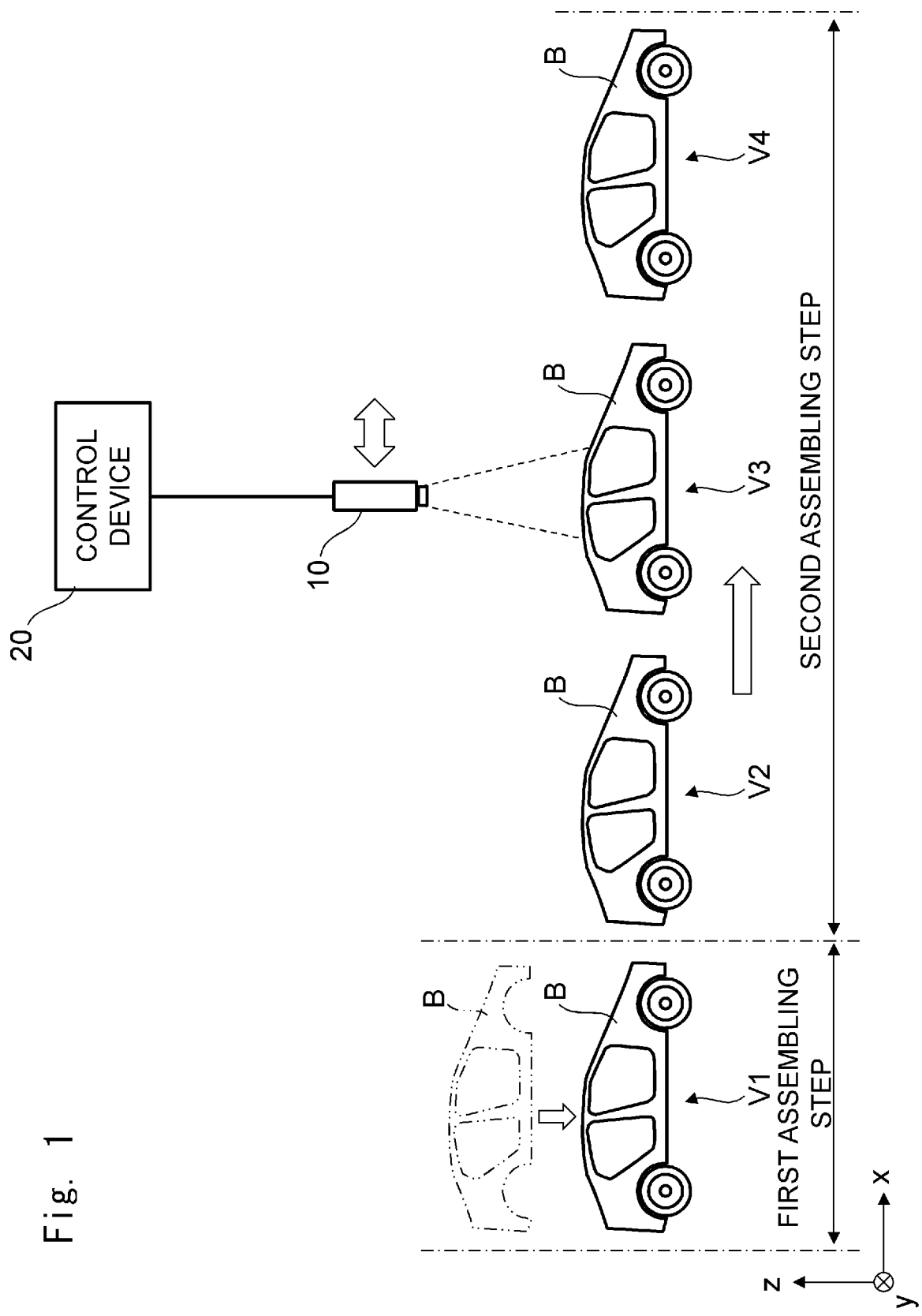
FIG. 1 is a block diagram showing an automobile production system according to a first embodiment.

Firstly, an automobile production system according to a first embodiment is described with reference to FIG. 1. FIG. 1 is a block diagram showing an automobile production system according to the first embodiment. As shown in FIG.

1, the automobile production system according to the first embodiment includes an image-pickup device 10 and a control device 20.

Further, needless to say, right-handed xyz orthogonal coordinate systems shown in FIG. 1 and other drawings are shown for the sake of convenience to explain positional relations among components. In general, a z-axis positive direction is a vertically upward direction and an xy-plane is a horizontal plane. These rules are applied throughout the drawings.

Firstly, a manufacturing line in an automobile production system according to this embodiment is described.

The automobile production system according to this embodiment is not limited to any particular automobile production system, but is a production system for automobiles that can autonomously travel while recognizing and following a preceding vehicle. For example, the automobile production system according to this embodiment is a production system for automobiles equipped with a cruise control function, a lane departure warning function, an autonomous driving function, etc.

The manufacturing line shown in FIG. 1 includes a first assembling step and a second assembling step.

In the first assembling step, components for enabling a vehicle to be manufactured to autonomously travel (e.g., components for traveling, motors, batteries, sensors, and a driving control device) are assembled onto a body B. The components for traveling include, for example, tires, wheels, suspensions, steering devices, braking devices, etc. An engine such as a gasoline engine or a diesel engine may be assembled onto the body B as a driving source, instead of assembling the motors onto the body B. In that case, a fuel tank may be assembled onto the body B, instead of assembling batteries such as secondary batteries or fuel cells onto the body B. The sensors are for recognizing a preceding vehicle and are, for example, millimeter-wave sensors.

That is, the vehicles to be manufactured in the automobile production system according to this embodiment are not limited to cars that can be driven by motors, such as electric cars, hybrid cars, and fuel-cell cars, and may instead be cars that can be driven by engines. Further, these types of cars may be on the same manufacturing line in a mixed manner.

In the first assembling step, a plurality of components may be pre-assembled into a module in advance and assembled onto the body B all at once. Alternatively, components may be successively assembled onto the body B while the body B is being conveyed by a conveyor or the like. As shown in FIG. 1, for example, doors are dismounted from the body B before components are assembled onto the body B. The body B is conveyed, for example, from a painting step.

Next, in the second assembling step, interior components are successively assembled onto the vehicle to be manufactured. In this embodiment, the interior components are successively assembled onto the vehicle to be manufactured while making the vehicle to be manufactured autonomously travel so as to follow an adjacent vehicle to be manufactured that is traveling ahead of the vehicle to be manufactured of interest. In the example shown in FIG. 1, a vehicle V3 to be manufactured follows a forefront vehicle V4 to be manufactured, and a vehicle V2 to be manufactured follows the vehicle V3 to be manufactured. Further, interior components are attached to these vehicles while they are autonomously traveling in an x-axis positive direction.

In the second assembly process, for example, interior components such as package trays, carpets, consoles, roof side inner garnishes, front seats, rear seats, and doors are assembled onto the vehicle to be manufactured. Further, in the second assembling step, for example, bumpers may be assembled onto the vehicle to be manufactured after the interior components are assembled onto the vehicle. It is possible to prevent surfaces of the bumpers from being scratched by assembling them onto the vehicle to be manufactured as late as possible.

In this embodiment, in the line of the second assembling step, there is no need to use a conveyor or carriages for conveying manufactured vehicles. Therefore, the cost for the manufacturing facility can be reduced. Note that, needless to say, components may be successively assembled onto the vehicle to be manufactured while conveying the vehicle to be manufactured by a conveyor, a carriage, or the like.

Vehicles to be manufactured completed in the second assembling step (completed vehicles) are successively moved to an inspection step (not shown).

Next, details of the image-pickup device 10 and the control device 20 are described one by one.

The image-pickup device 10 is a camera or the like that takes an image of each of the vehicles V1 to V4 to be manufactured that has been moved to a predetermined position on the manufacturing line (in the second assembling step in the example shown in FIG. 1). Note that the image may be a moving image or a still image. As shown in FIG. 1, in this embodiment, the image-pickup device 10 can be moved in an x-axis direction, a y-axis direction, and a z-axis direction. That is, the image-pickup device 10 can be freely moved in three-dimensional directions within predetermined ranges.

For example, the image-pickup device 10 is mounted on an xyz-stage (not shown). Further, the posture (the shooting direction) and the angle of view of the image-pickup device 10 can also be freely changed within predetermined ranges. As shown in FIG. 1, in this embodiment, the image-pickup device 10 is connected to the control device 20 through a cable. Note that the image-pickup device 10 may be mounted, for example, on a drone and wirelessly connected to the control device 20.

Note that various movements of the image-pickup device 10 (the above-described movement, changes in the posture, changes in the angle of view, etc.) are conceivable. For example, the image-pickup device 10 may be moved only in one direction or may be moved only on the xy-plane. Further, the image-pickup device 10 may be fixed. That is, the image-pickup device 10 may not be moved and its posture may be fixed. Further, the shooting range of the image-pickup device 10 may be fixed. That is, the image-pickup device 10 may be configured so that it performs a fixed-point observation.

The control device 20 controls the image-pickup device 10 and associates images of the vehicle V1 to V4 to be manufactured acquired from the image-pickup device 10 with information about the respective purchasers of the vehicle V1 to V4 to be manufactured. The control device 20 identifies, for example, the vehicles V1 to V4 to be manufactured on the manufacturing line based on production record information and acquires information about the respective purchasers of the vehicles V1 to V4 to be manufactured in advance. Therefore, the control device 20 can associate an image of each of the vehicles V1 to V4 to be manufactured with information about its purchaser.

By the above-described configuration, the control device 20 can deliver the image of each of the vehicles V1 to V4 to be manufactured to the respective purchaser in real time, or recode the image on a storage medium.

That is, in the automobile production system according to this embodiment, each purchaser can check an actual state in which an automobile itself that he/she has purchased is being manufactured through real-time images or images recorded on the storage medium. As a result, it is possible to improve customer satisfaction. Note that an example in which images are delivered in real time will be described in detail in the below shown second embodiment.

Second Embodiment

<Automobile Production System>

Figure 2:
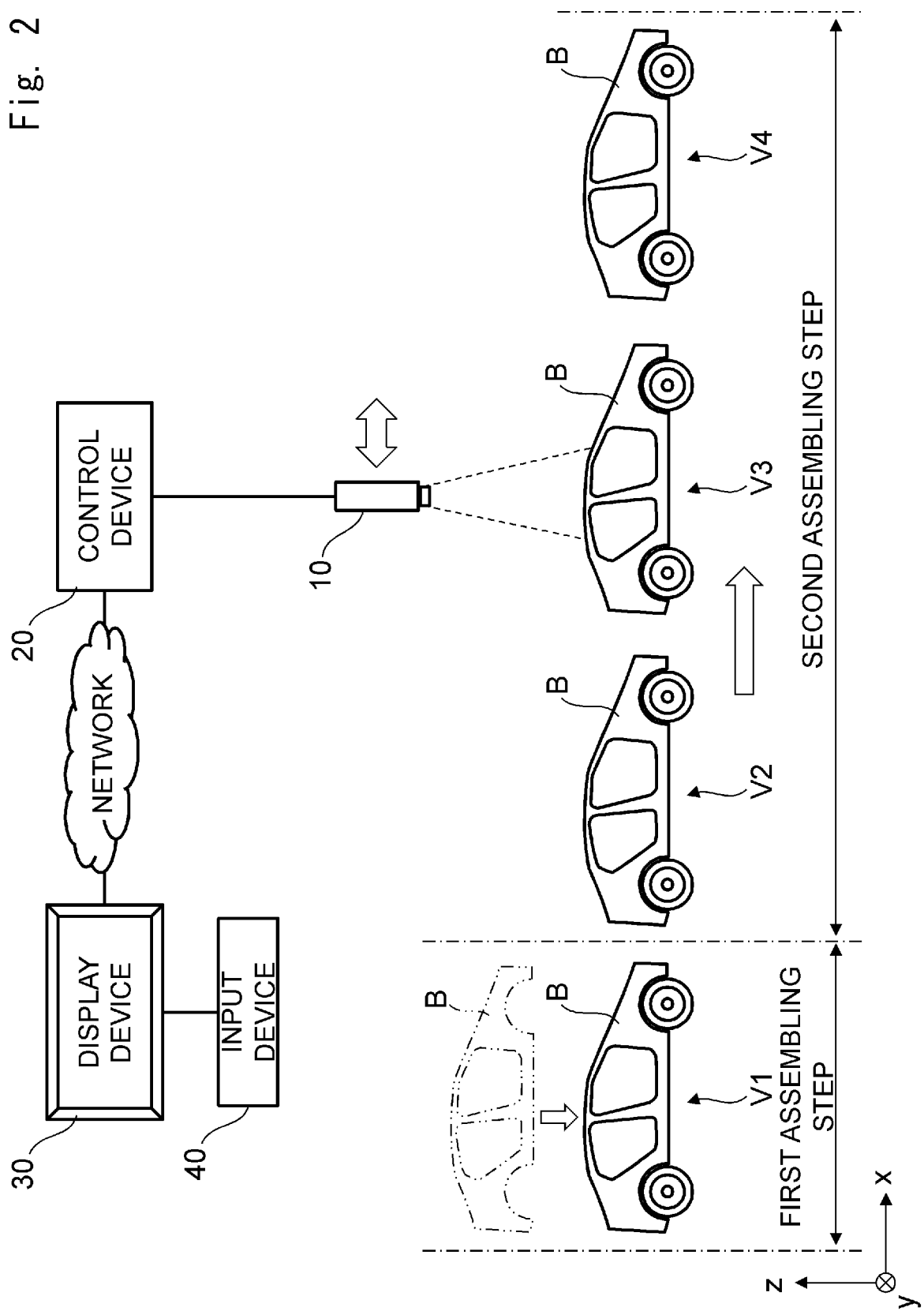
FIG. 2 is a block diagram showing an automobile production system according to a second embodiment.

Next, an automobile production system according to a second embodiment is described with reference to FIG. 2. FIG. 2 is a block diagram showing an automobile production system according to the second embodiment.

As shown in FIG. 2, the automobile production system according to the second embodiment includes a display device 30 and an input device 40 in addition to the image-pickup device 10 and the control device 20. The rest of the configuration is similar to that of the first embodiment.

As shown in FIG. 2, in this embodiment, the display device 30 is connected to the control device 20 through a network. The display device 30 is not limited to any particular devices. For example, the display device 30 may be a display of a smartphone possessed by a purchaser, a monitor of a personal computer, or the like. The display device 30 enables each purchaser to check images that are delivered from the control device 20 in real time.

As described above, in the automobile production system according to this embodiment, each purchaser can check an actual state in which an automobile itself that he/she has purchased is being manufactured through real-time images, instead of through recorded images. Therefore, it is possible to improve customer satisfaction even further as compared to the automobile production system according to the first embodiment.

Note that the display device 30 may be, for example, a display device installed in a dealer or a factory of an automobile manufacturer, instead of the display device possessed by the purchaser. Further, the display device 30 may be connected to the control device 20 without a network intervening therebetween.

As shown in FIG. 2, in this embodiment, the input device 40 is connected to the control device 20 through the display device 30 and the network. The input device 40 is not limited to any particular devices. For example, the input device 40 may be a touch panel of a smartphone possessed by a purchaser, a keyboard of a personal computer, or the like. Alternatively, the input device 40 may be a joystick or the like. By the input device 40, for example, a purchaser of the vehicle V2 to be manufactured can manipulate (e.g., move) the area to be shot by the image-pickup device 10 while checking images that are delivered to the display device 30 in real time.

That is, in the automobile production system according to this embodiment, a purchaser can actually check a part of a vehicle to be manufactured that he/she wants to check in detail by manipulating (e.g., moving) the area to be shot by the image-pickup device 10 by himself/herself. Therefore, it is possible to improve customer satisfaction even further as compared to the automobile production system according to the first embodiment.

Figure 3:
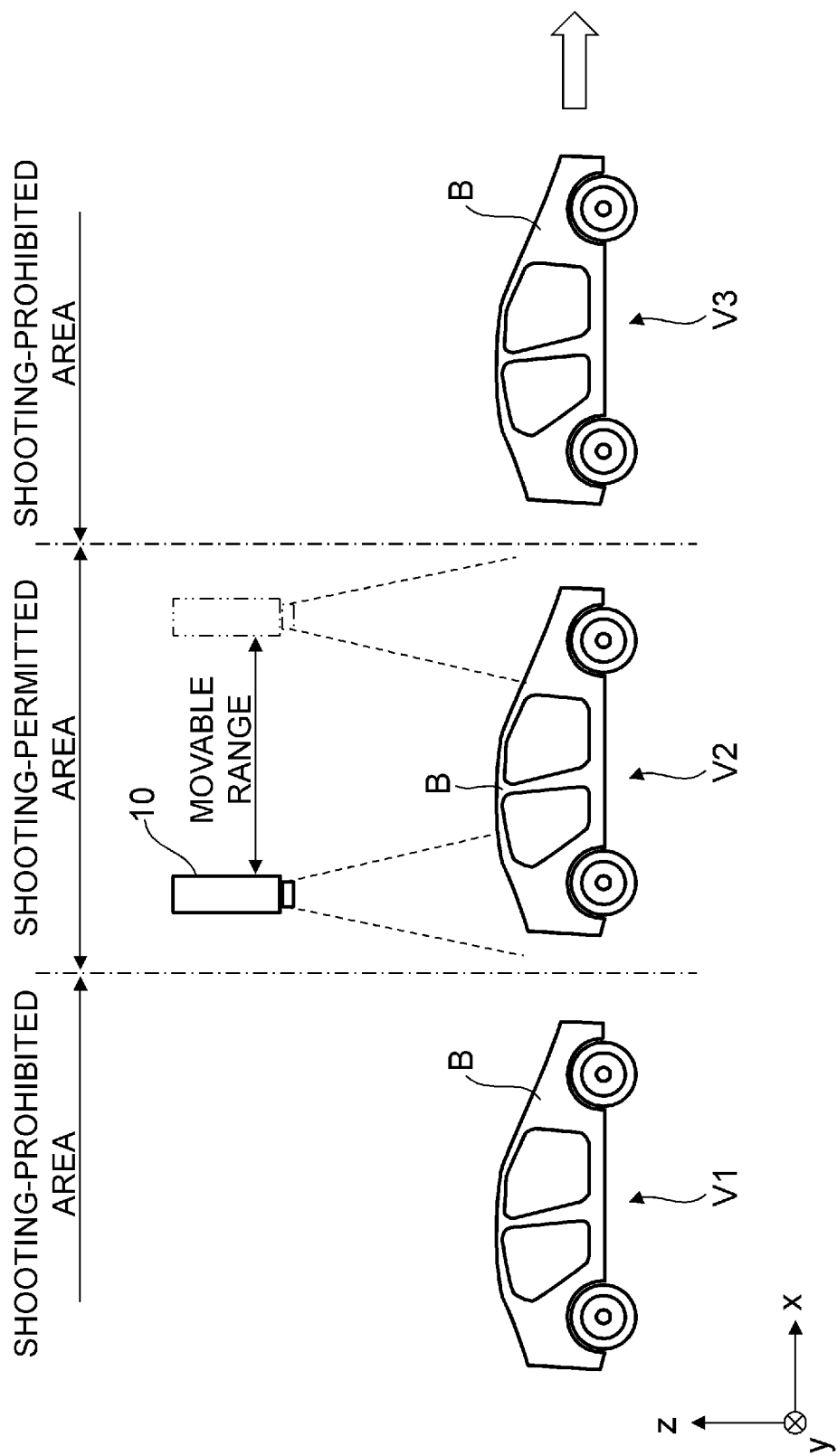
FIG. 3 is a schematic side view showing movements performed by an image-pickup device 10.

Here, FIG. 3 is a schematic side view showing movements performed by the image-pickup device 10. As shown in FIG. 3, a shooting-permitted area and a shooting-prohibited area are defined on the manufacturing line. The shooting-prohibited area is defined, for example, to protect technical know-how and trade secrets. In the automobile production system according to this embodiment, when the image-pickup device 10 is operated by using the input device 40, the movement of the image-pickup device 10 is restricted so that the shooting-prohibited area is not shot.

The movement of the image-pickup device 10 (the above-described movement, changes in the posture, changes in the angle of view, etc.) may be mechanically restricted by stoppers or the like, or may be restricted by electrical control by the control device 20. Owing to such restrictions on the movement of the image-pickup device 10, it is possible to prevent the shooting-prohibited area from being shot even when a purchaser operates the image-pickup device 10 so as to shoot the shooting-prohibited area by using the input device 40.

Note that, for example, RFIDs (Radio Frequency Identifiers) may be arranged in a row on the boundary between the shooting-permitted area and the shooting-prohibited area so that the control device 20 can recognize the shooting-prohibited area.

As described above, in the automobile production system according to this embodiment, it is possible to actually check a part of a vehicle to be manufactured that a purchaser wants to check in detail while protecting technical know-how and trade secrets. Therefore, it is possible to improve customer satisfaction even further as compared to the automobile production system according to the first embodiment.

Figure 4:
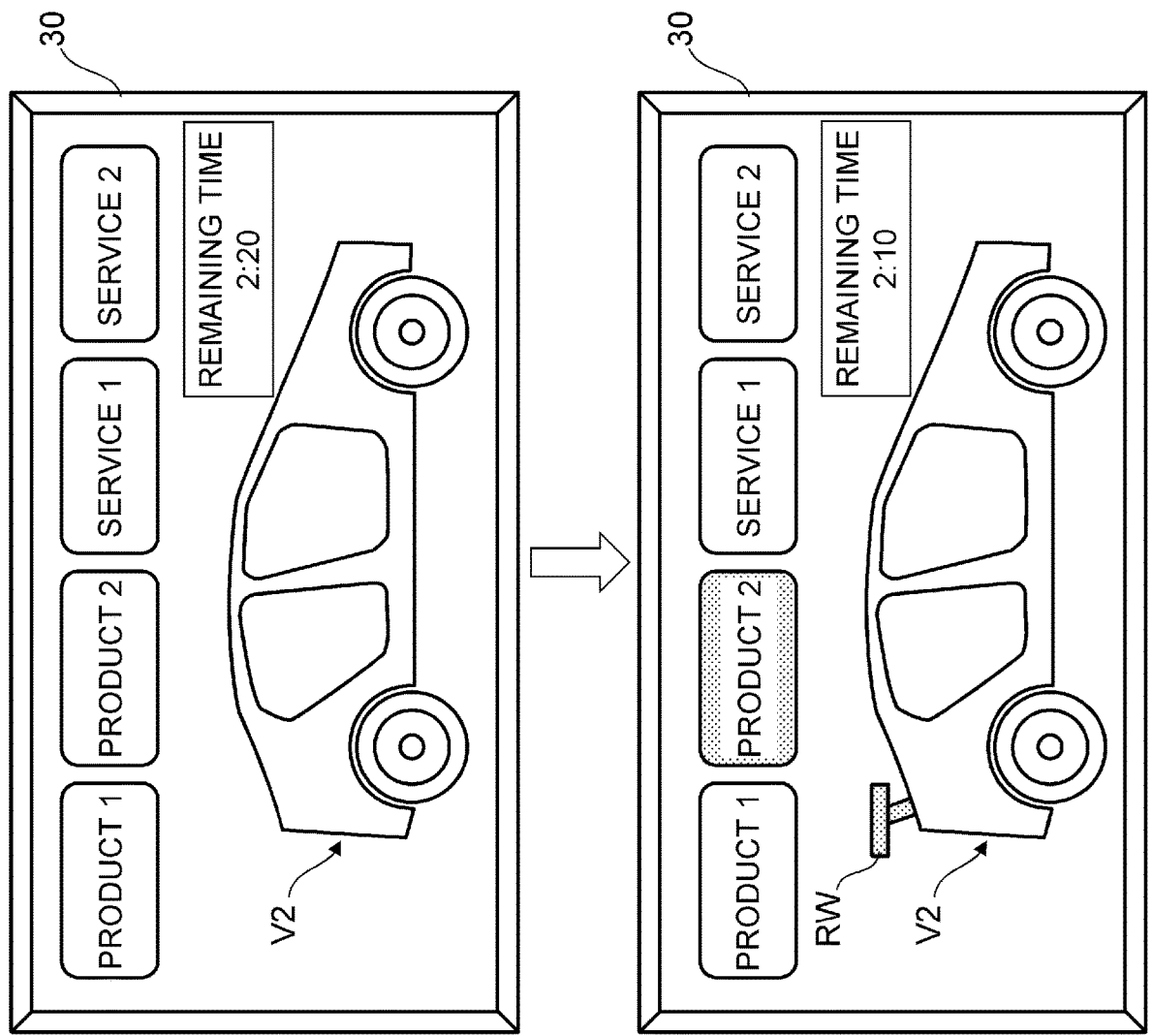
FIG. 4 is a schematic view showing an example of a screen displayed in a display device 30.

Here, FIG. 4 is a schematic diagram showing an example of a screen displayed on the display device 30. As shown in a displayed screen shown in an upper part of FIG. 4, images of products or services (hereinafter referred to as "products and the like") that can be added to the vehicle V2 to be manufactured on the manufacturing line may be displayed together with the image of the vehicle V2 to be manufactured. In the example shown in FIG. 4, two products, i.e., a "Product 1" and a "Product 2" and two services, i.e., a "Service 1" and a "Service 2" are displayed. Further, in the example shown in FIG. 4, a "remaining time" until the end of ordering is also displayed on the screen. Further, for example, a speech introducing products etc. and/or voices counting down the "remaining time" may be played (i.e., produced) along with the image.

Examples of the products include various optional parts. Examples of the services include decorating bumpers or interior resin components with text, patterns, etc.

Note that although products are indicated by text such as the "Product 1" in FIG. 4, photographs, drawings, etc. showing products and services are displayed on the actual screen.

Further, as shown in FIG. 4, a composite image of the vehicle V2 to be manufactured in a state in which a selected product(s) or service(s) is added thereto may be generated from the image of the vehicle V2 to be manufactured and the generated composite image may be displayed. In the example shown in a displayed screen shown in a lower part of FIG. 4, as a purchaser has selected the "Product 2" (a rear wing), a composite image of the vehicle V2 to be manufactured in a state in which the rear wing RW is added thereto is generated.

As described above, when a purchaser determines whether or not to additionally order a product or the like that can be added to the vehicle, he/she can check a state in which the product or the like has been added to the vehicle itself that he/she has purchased through the composite image of the vehicle. Therefore, compared to the case where products or the like that can be added to the vehicle are simply displayed (e.g., compared to the displayed screen shown in the upper part of FIG. 4), the purchaser can easily determine whether or not to additionally order the product or the like and customer satisfaction at the time of actual purchase is improved.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An automobile production system comprising:
an image-pickup device configured to take an image of a vehicle to be manufactured on a manufacturing line;
a control device configured to control the image-pickup device;
a display device configured to display the image; and
an input device by which a user can move an area to be shot by the image-pickup device through the control device while checking an image displayed in the display device, wherein
the control device associates the image of the vehicle to be manufactured acquired from the image-pickup device with information about a purchaser of the vehicle to be manufactured,
the control device delivers the image of the vehicle to be manufactured acquired from the image-pickup device to the display device in real time, and
a shooting-prohibited area is defined on the manufacturing line, and when the image-pickup device is operated by using the input device, the movement of the image-pickup device is restricted so that the shooting-prohibited area is not shot.

2. The automobile production system according to claim 1, wherein
when the control device displays the image of the vehicle to be manufactured in the display device, the control device
displays at least one product or service that can be added to the vehicle to be manufactured together with the image of the vehicle to be manufactured, and
generates a composite image of the vehicle to be manufactured in a state in which a selected product or service is added thereto from the image of the vehicle to be manufactured and displays the generated composite image.

* * * * *